(12) United States Patent
Jeon et al.

(10) Patent No.: US 12,087,929 B2
(45) Date of Patent: Sep. 10, 2024

(54) BATTERY MODULE

(71) Applicant: SK ON CO., LTD., Seoul (KR)

(72) Inventors: Hae Ryong Jeon, Daejeon (KR); Sun Mo An, Daejeon (KR); Ha Chul Jeong, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/465,180

(22) Filed: Sep. 12, 2023

(65) Prior Publication Data
US 2023/0420769 A1 Dec. 28, 2023

Related U.S. Application Data

(63) Continuation of application No. 17/473,605, filed on Sep. 13, 2021, now Pat. No. 11,799,147.

(30) Foreign Application Priority Data

Sep. 15, 2020 (KR) ........................ 10-2020-0118430

(51) Int. Cl.
*H01M 10/6551* (2014.01)
*H01M 10/613* (2014.01)
(Continued)

(52) U.S. Cl.
CPC ..... *H01M 10/6551* (2015.04); *H01M 10/613* (2015.04); *H01M 10/647* (2015.04);
(Continued)

(58) Field of Classification Search
CPC ........... H01M 10/6551; H01M 10/613; H01M 10/647; H01M 10/6554; H01M 10/6556;
(Continued)

(56) References Cited

U.S. PATENT DOCUMENTS 9,653,763 B2 * 5/2017 Wayne ............. H01M 10/6557
2013/0115506 A1 5/2013 Wayne et al.
(Continued)

FOREIGN PATENT DOCUMENTS

CN 203351708 U 12/2013
CN 105229362 A 1/2016
(Continued)

OTHER PUBLICATIONS

Office Action issued by the China National Intellectual Property Administration (CNIPA) for Application No. 202111082900.1 dated Jun. 29, 2023.
(Continued)

*Primary Examiner* — Jimmy Vo
(74) *Attorney, Agent, or Firm* — IP & T GROUP LLP

(57) ABSTRACT

A battery module, includes: a battery cell stack in which a plurality of battery cells are stacked; a first heat dissipation member disposed on one side of the cell stack; a second heat dissipation member disposed on the other side of the cell stack; and a blocking member providing a plurality of insulation spaces in which the battery cells are disposed, the blocking member surrounding at least one surface of each of the battery cells; wherein the plurality of the battery cells, include a first battery cell having a surface contacting the first heat dissipation member; and a second battery cell having a surface contacting the second heat dissipation member.

13 Claims, 7 Drawing Sheets

(51) Int. Cl.
*H01M 10/647* (2014.01)
*H01M 10/6554* (2014.01)
*H01M 10/6556* (2014.01)
*H01M 50/184* (2021.01)
*H01M 50/211* (2021.01)
*H01M 50/222* (2021.01)
*H01M 50/24* (2021.01)

(52) U.S. Cl.
CPC ... *H01M 10/6554* (2015.04); *H01M 10/6556* (2015.04); *H01M 50/184* (2021.01); *H01M 50/211* (2021.01); *H01M 50/222* (2021.01); *H01M 50/24* (2021.01)

(58) Field of Classification Search
CPC .. H01M 50/24; H01M 50/211; H01M 50/184; H01M 50/222
See application file for complete search history.

(56) References Cited

U.S. PATENT DOCUMENTS

| | | | |
|---|---|---|---|
| 2015/0125723 A1 | 5/2015 | You et al. | |
| 2016/0093929 A1* | 3/2016 | Obasih | H01M 10/6551 429/120 |
| 2016/0099442 A1 | 4/2016 | Kanayama | |
| 2018/0287226 A1 | 10/2018 | Yoo et al. | |
| 2020/0099114 A1 | 3/2020 | Ryu et al. | |
| 2020/0220238 A1 | 7/2020 | Yeh et al. | |
| 2020/0243935 A1 | 7/2020 | Morita et al. | |

FOREIGN PATENT DOCUMENTS

| | | |
|---|---|---|
| CN | 206076347 U | 4/2017 |
| CN | 109411653 A | 3/2019 |
| CN | 209822750 U | 12/2019 |
| CN | 110832664 A | 2/2020 |
| CN | 111200088 A | 5/2020 |
| CN | 111416071 A | 7/2020 |
| CN | 111463519 A | 7/2020 |
| CN | 111477781 A | 7/2020 |
| KR | 10-1971512 B1 | 4/2019 |
| KR | 10-2081396 B1 | 2/2020 |
| WO | 2011/146919 A2 | 11/2011 |
| WO | 2019/167689 A1 | 9/2019 |
| WO | 2020/013120 A1 | 1/2020 |

OTHER PUBLICATIONS

Office Action for the U.S. Appl. No. 17/473,605 issued by the USPTO on Jan. 20, 2023.

* cited by examiner

BATTERY MODULE

CROSS-REFERENCE TO RELATED APPLICATION(S)

This application is a continuation of U.S. patent application Ser. No. 17/473,605 filed on Sep. 13, 2021, which claims benefit of priority to Korean Patent Application No. 10-2020-0118430 filed on Sep. 15, 2020 in the Korean Intellectual Property Office, the disclosure of which is incorporated herein by reference in its entirety.

BACKGROUND

1. Field

The present disclosure relates to a battery module.

2. Description of Related Art

Secondary batteries, unlike primary batteries, can be electrically charged and discharged, and thus, secondary batteries can be applied to devices within various fields, such as digital cameras, cell phones, laptops, and hybrid vehicles. Such secondary batteries may include, for example, a nickel-cadmium battery, a nickel-metal hydride battery, a nickel-hydrogen battery, a lithium secondary battery, and the like.

Among such secondary batteries, many studies have been conducted into lithium secondary batteries having high energy density and discharge voltage. Recently, lithium secondary batteries have been manufactured as pouch-type battery cells with flexibility to be configured and used in the form of a module through the connection of a plurality of pieces.

The lithium secondary battery market is receiving a lot of attention, not only in the energy storage system (ESS) field but also in the electric vehicle (EV) field.

Meanwhile, when the battery module is used for a long time or is subjected to a physical shock, heat may be generated in a battery to reduce the efficiency of the battery, and in the worst case scenario, it may ignite and lead to an explosion.

In addition, when a flame occurs in any one of a plurality of battery cells included in the battery module, there is a problem in that the flame is easily spread by propagating to other battery cells disposed adjacently.

Battery stability is very important in electric vehicles and energy storage systems. Therefore, a design for preventing overheating of battery cells or thermal runaway of the battery cells is required.

SUMMARY

An aspect of the present disclosure is to provide a battery module capable of suppressing propagation of a flame or heat when a battery cell is overheated or a flame is generated in a battery cell.

According to an aspect of the present disclosure, a battery module, includes: a battery cell stack in which a plurality of battery cells are stacked; a first heat dissipation member disposed on one side of the cell stack; a second heat dissipation member disposed on the other side of the cell stack; and a blocking member providing a plurality of insulation spaces in which the battery cells are disposed and surrounding at least one surface of the battery cells; wherein the plurality of the battery cells, may include a first battery cell having a surface contacting the first heat dissipation member; and a second battery cell having a surface contacting the second heat dissipation member.

In the present embodiment, each of the battery cells may include an accommodating portion in which an electrode assembly is disposed, and a sealing portion sealing at least part of a circumference of the accommodating portion, wherein any external surface of the accommodating portion of each battery cell on which the sealing portion is not disposed is formed as a heat dissipating surface, wherein the surface of the first battery cell and the surface of the second battery cell contacting the first and second dissipation member, respectively, are formed as the heat dissipating surfaces.

In the present embodiment, the blocking member may be disposed in zigzag form to surround the battery cells.

In the present embodiment, the blocking member may be disposed to surround at least two surfaces of the battery cell.

In the present embodiment, the blocking member may be formed of a single member having flexibility.

In the present embodiment, the blocking member may be formed of a flame-resistant material that is ignited at a temperature of 800° C. or higher.

In the present embodiment, the blocking member may be formed of a material having thermal conductivity of 0.1 W/mK or less.

In the present embodiment, in the cell stack, the first battery cell and the second battery cell may be each disposed in a corresponding one of the plurality of the insulation spaces.

In the present embodiment, in the cell stack, the first battery cell and the second battery cell may be each disposed to be alternately stacked.

In the present embodiment, the cell stack may include at least one plate-shaped flame-retardant member or a cooling pad disposed between the battery cells.

In the present embodiment, the flame-retardant member may be formed of a flame-resistant material and may be formed in a form of a thin plate or a foam pad having rigidity.

In the present embodiment, the blocking member may include plate-shaped cooling members disposed between the battery cells, and an interconnection member connecting the cooling members.

In the present embodiment, the cooling member may include a cooling passage through which coolant circulates therein.

According to an aspect of the present disclosure, a battery module includes: a plurality of cell stacks in which battery cells are stacked; a first heat dissipation member, wherein at least a portion of the first heat dissipation member is disposed between the cell stacks; a second heat dissipation member coupled to the first heat dissipation member to form an accommodating space in which the cell stacks are disposed; and a blocking member providing a plurality of insulation spaces in which the battery cells are disposed and surrounding at least one surface of each of the battery cells, wherein the plurality of battery cells may include: a first battery cell having a surface contacting the first heat dissipation member; and a second battery cell having a surface contacting the second heat dissipation member.

In the present embodiment, the first heat dissipation member may include an intermediate plate member disposed between the two cell stacks, an upper plate member fastened to an upper end of the intermediate plate member and disposed to face an upper surface of the cell stack; and a lower plate member fastened to a lower end of the intermediate plate member and disposed to face a lower surface of the cell stack.

In the present embodiment, the second heat dissipation member may have one side coupled to the upper plate member and the other side coupled to the lower plate member.

In the present embodiment, a cooling device coupled to an outer surface of the lower plate member may further be included.

According to an aspect of the present disclosure, a battery module, includes: a battery cell stack; a blocking member forming a plurality of insulation spaces, each insulation space accommodating a battery cell among a corresponding plurality of battery cells forming the battery cell stack; a first heat dissipation member in direct contact with one surface of a first battery cell that is not covered by the blocking member at a first side of the battery cell stack; and a second heat dissipation member in direct contact with one surface of a second battery cell that is not covered by the blocking member at a second side of the battery cell stack opposite to said first side of the battery cell stack.

In the present embodiment, each of the battery cells includes: an accommodating portion in which an electrode assembly is disposed; and a sealing portion formed for sealing at least part of a circumference of the accommodating portion, wherein any external surface of the accommodating portion of each battery cell on which the sealing portion is not disposed is formed as a heat dissipating surface, and wherein the one surface of the first battery cell and the one surface of the second battery cell are formed as heat dissipating surfaces.

In the present disclosure, the blocking member is made of a flexible and flame-retardant material that is ignited only at a temperature of 800° C. or higher and has thermal conductivity of 0.1 W/mK or less.

In the present disclosure, the blocking member includes mica.

In the present disclosure, the blocking member includes a plurality of insulation spaces each defined by a rectangular box frame having a top side, a bottom side and only one of the lateral sides enclosed.

In the present disclosure, the blocking member is made of a continuous sheet of material.

In the present disclosure, the blocking member is made by folding the continuous sheet of material multiple times while alternating the direction of folding in a zigzag pattern in order to form the multiple insulation spaces.

In the present disclosure, the blocking member is disposed to surround at least a top surface, a bottom surface and one of the longitudinal side surfaces of each of the battery cells.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
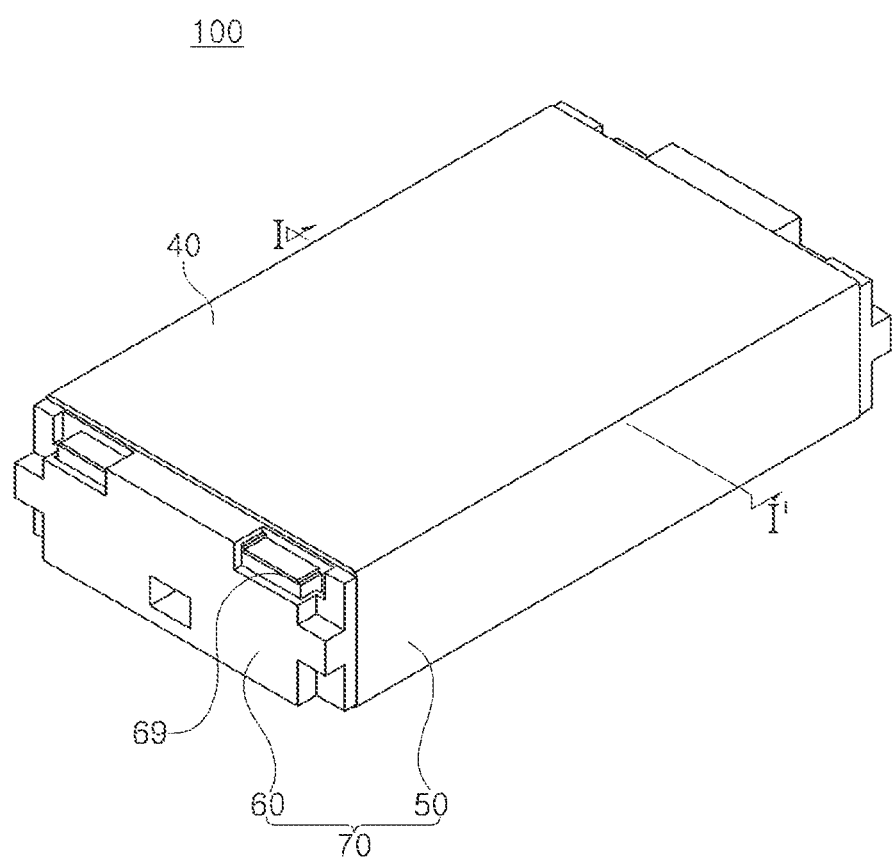
FIG. 1 is a perspective view schematically illustrating a battery module according to an embodiment of the present disclosure.

Prior the detailed description of the present disclosure, the terms or words in the present specification and claims should not constructed as limited to ordinary or dictionary meanings, and it should be construed as meaning and concept consistent with the technical idea of the present disclosure based on the principle that it can be properly defined as a concept of a term in order to explain the present disclosure in the best way. Therefore, the embodiments described in the present specification and the configurations shown in the drawings are merely the most preferred embodiments of the present disclosure, and are not intended to represent all of the technical ideas of the present disclosure. It should be understood that various equivalents and modifications may be substituted for them at the time of filing of the present application.

Hereinafter, exemplary embodiments of the present disclosure will be described in detail with reference to the accompanying drawings. Further, the detailed description of known functions and constructions that may obscure the gist of the present invention will be omitted. For the same reason, some of the elements in the accompanying drawings are exaggerated, omitted, or schematically shown, and the size of each element does not entirely reflect the actual size.

For example, in the present specification, terms "upper side", "lower side", "side surface", and the like, are represented based on the drawings and may be differently represented when directions of corresponding targets are changed.

Figure 2:
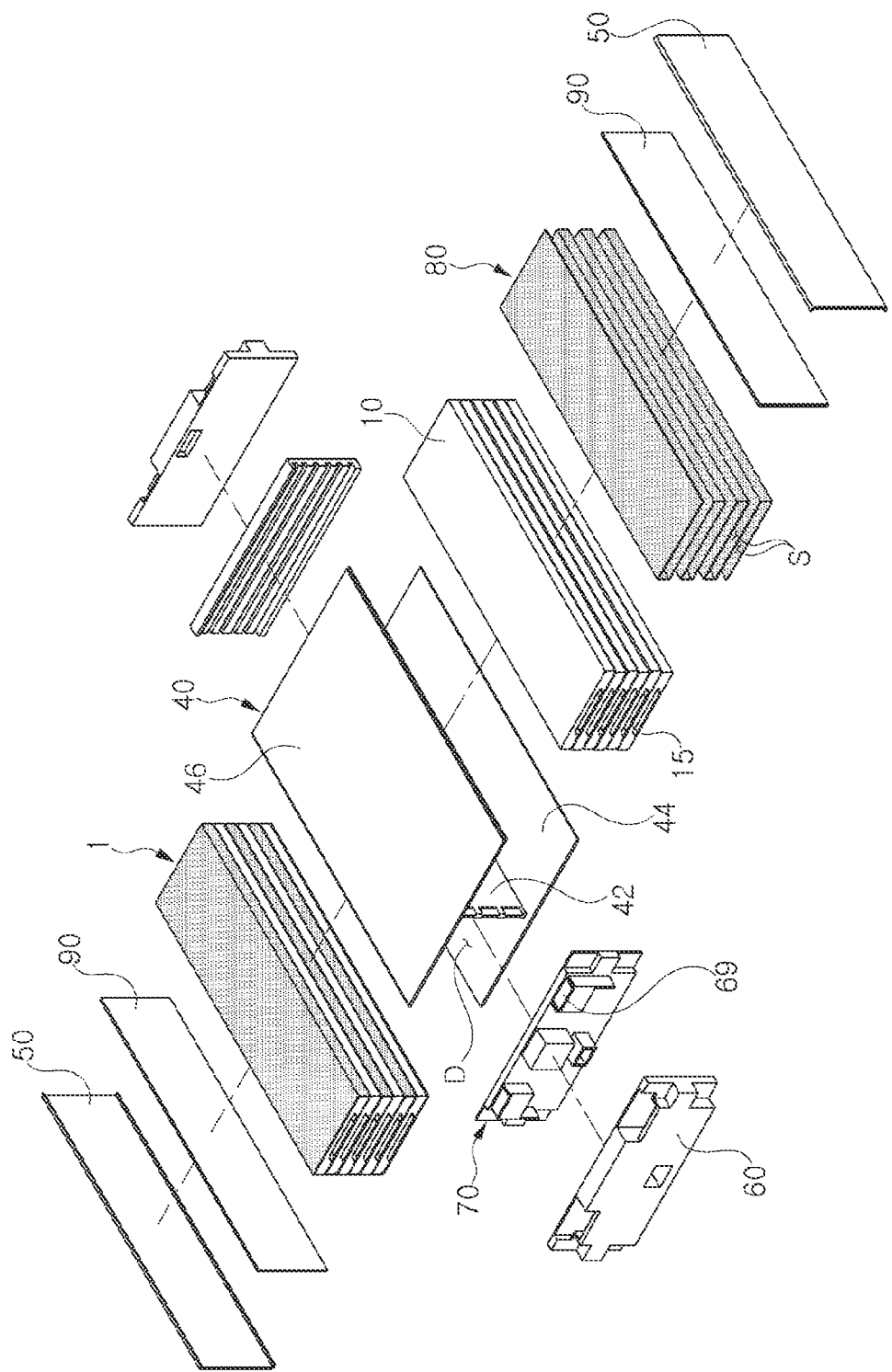
FIG. 2 is an exploded perspective view of the battery module shown in FIG. 1.

FIG. 1 is a perspective view schematically illustrating a battery module according to an embodiment of the present disclosure, and FIG. 2 is an exploded perspective view of the battery module shown in FIG. 1. In addition, FIG. 3 is an enlarged perspective view of the battery cell of FIG. 2, and FIG. 4 is a cross-sectional view taken along line I-I' of FIG. 1.

Referring to FIGS. 1 to 4, a battery module 100 of the present embodiment may include a cell stack 1, a first heat dissipation member 40, a second heat dissipation member 50, and a side cover 60.

Figure 3:
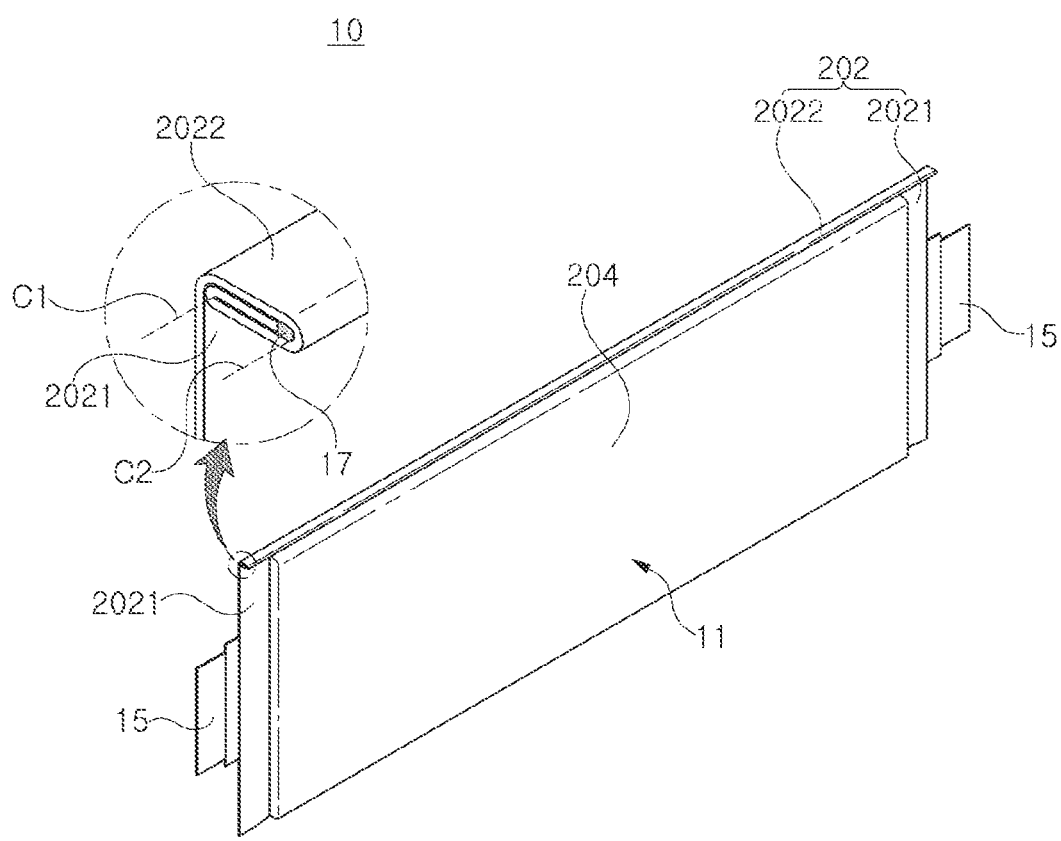
FIG. 3 is an enlarged perspective view of the battery cell of FIG. 2.
Figure 4:
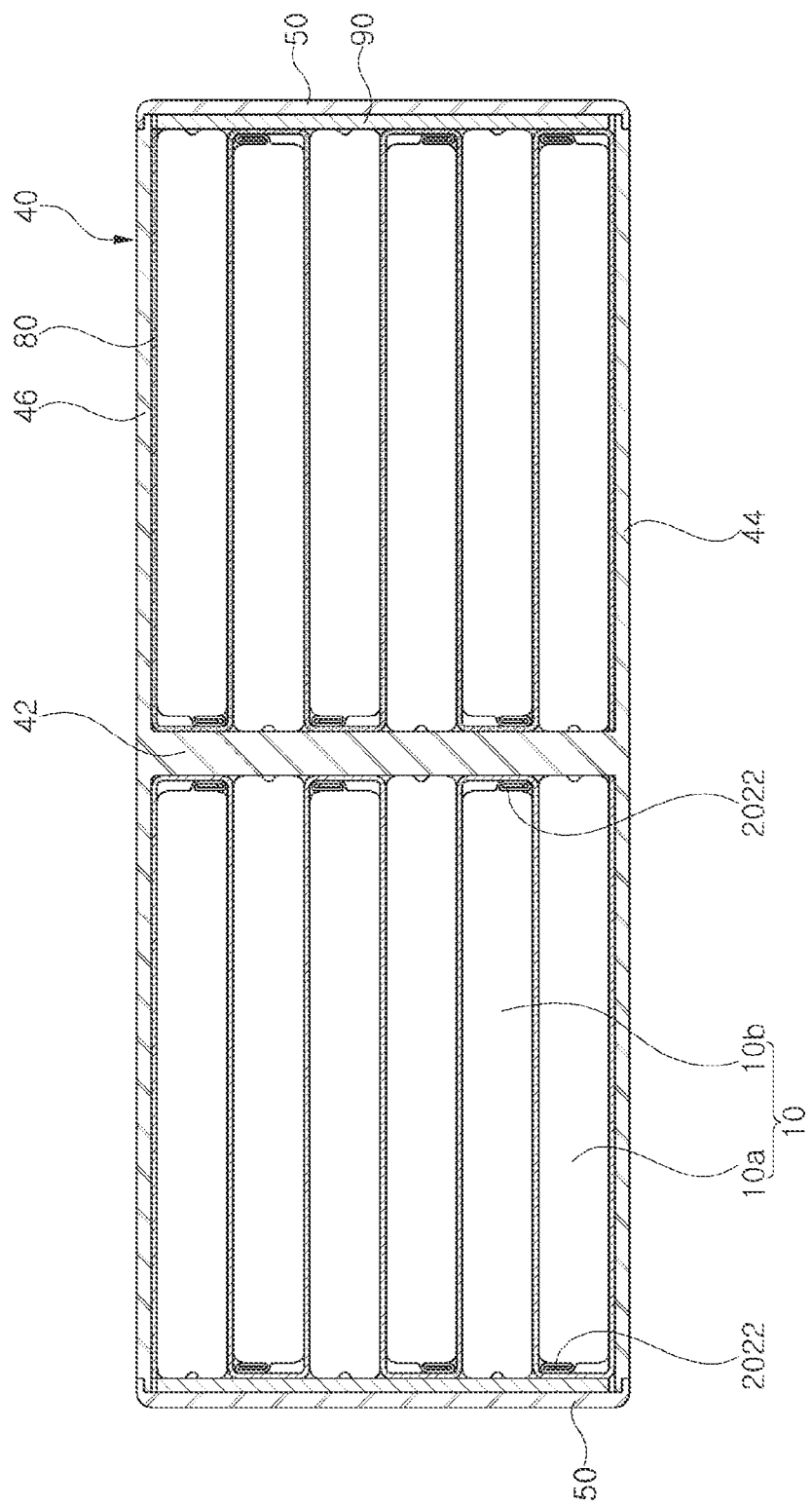
FIG. 4 is a cross-sectional view taken along line I-I' of FIG. 1.

The cell stack 1 is formed by stacking a plurality of battery cells 10 shown in FIG. 3. In the present embodiment, the battery cells 10 are stacked in an up-and-down direction (or a vertical direction). However, it is also possible to configure so as to be stacked in a left-and-right direction, if necessary.

Each of the battery cells 10 may be a pouched-type secondary battery, and may have a structure in which an electrode lead 15 protrudes externally.

The battery cell 10 may be configured in a form in which an electrode assembly (not shown) is accommodated in a pouch 11.

The electrode assembly includes a plurality of electrode plates and electrode tabs and is accommodated in the pouch 11. Here, the electrode plate may be comprised of a positive electrode plate and a negative electrode plate, and the electrode assembly may be configured in a form in which the positive electrode plate and the negative electrode plate are stacked such that wide surfaces thereof face each other with a separator interposed therebetween.

The positive electrode plate and the negative electrode plate are formed in a structure in which an active material slurry is applied to a current collector, and the slurry may be typically formed by stirring a granular active material, an auxiliary conductor, a binder, a plasticizer, and the like, in a state in which a solvent is added.

In addition, in the electrode assembly, a plurality of positive plates and a plurality of negative plates are stacked in a vertical direction. In this case, each of the plurality of positive plates and the plurality of negative plates may be provided with electrode tabs, and may be connected to the same electrode lead 15 by contacting the same polarities with each other.

In the present embodiment, the two electrode leads 15 may be disposed to face each other in opposite directions.

The pouch 11 may be formed in a form of a container to form an exterior of the battery cell 10, and may provide an internal space in which the electrode assembly and an electrolyte (not shown) are accommodated. In this case, a portion of the electrode lead 15 of the electrode assembly may be exposed externally of the pouch 11.

The pouch 11 may be divided into a sealing portion 202 and an accommodating portion 204.

The accommodating portion 204 may be formed in a container shape to provide an internal space of a rectangular shape. An electrode assembly and an electrolyte may be accommodated in the internal space of the accommodating portion 204.

The sealing portion 202 is a portion to which a portion of the pouch 11 is bonded to seal a circumference of the accommodating portion 204. Accordingly, the sealing portion 202 may be formed in the form of a flange extending outwardly from the accommodating portion 204 formed in a container shape, and thus the sealing portion 202 may be disposed along an external surface of the accommodating portion 204.

A thermal fusion method may be used for bonding the pouch 11, but is not limited thereto.

In addition, in the present embodiment, the sealing portion 202 may be divided into a first sealing portion 2021 in which an electrode lead 15 is disposed and a second sealing portion 2022 in which an electrode lead 15 is not disposed.

In the present embodiment, the pouch 11 may be formed by forming a single sheet of exterior material. More specifically, after forming one or two accommodating portions in one exterior material, the exterior material may be folded such that the accommodating portions form one space (that is, an accommodating portion) to complete the pouch 11.

In the present embodiment, the accommodating portion 204 may be formed in a rectangular shape. In addition, a sealing portion 202 formed by bonding an exterior material may be provided on an external surface of the accommodating portion 204. Accordingly, in the battery cell 10 of the present embodiment, it is not necessary to form the sealing portion 202 on a surface on which the exterior material is folded. Therefore, in the present embodiment, the sealing portion 202 may be provided only on three surfaces of four surfaces forming an external surface of the accommodating portion 204, and a sealing portion is not disposed on any one surface of the external surfaces of the accommodating portion (a lower surface in FIG. 3, hereinafter a heat dissipating surface).

In the present embodiment, since the electrode leads 15 are disposed to face opposite directions, the two electrode leads 15 may be disposed on the sealing portions 202 formed on different sides. Accordingly, the sealing portion 202 of the present embodiment may be comprised of two first sealing portions 2021 in which electrode leads 15 are disposed, and one second sealing portion 2022 in which electrode leads 15 are not disposed.

In addition, in order to increase bonding reliability of the sealing portion 202 and minimize a volume occupied by the sealing portion 202 in a module of the sealing portion 202, the battery cell 10 may constitute the sealing portion 202 in a form of being folded at least once.

More specifically, the battery cell 10 according to the present embodiment may be configured such that the second sealing portion 2022 in which the electrode leads 15 are not disposed among the sealing portions 202 are folded twice.

The second sealing portion 2022 may be folded in a direction to reduce an area of the battery cell 10. For example, in the present embodiment, bending lines C1 and C2, which are the lines in which the second sealing portion 2022 is bent may be disposed in parallel with the external surface of the accommodating portion 204, and the second sealing portion 2022 may be folded in a form in which at least a portion of the second sealing portion 2022 is overlapped along the bending lines C1 and C2. Accordingly, the second sealing portion 2022 folded at least once may have the same width as a whole.

The second sealing portion 2022 may be folded twice by 180° along the first bending line C1 and the second bending line C2 shown in FIG. 3, and then may be fixed by being folded at 90° along the first bending line C1 again.

In this case, an inside of the second sealing portion 2022 may be filled with an adhesive member 17, and thus the second sealing portion 2022 may maintain a shape folded twice by the adhesive member 17. The adhesive member 17 may be formed of an adhesive having high thermal conductivity. For example, the adhesive member 17 may be formed of epoxy or silicone, but is not limited thereto.

The battery cell 10 configured as described above may be a battery capable of charging and discharging, and specifically, may be a lithium ion (Li-ion) battery or a nickel metal hydride (Ni-MH) battery.

The cell stack 1 in which a plurality of battery cells 10 are stacked is insertedly disposed in an accommodating space of a first heat dissipation member 40 to be described later.

In the present embodiment, the cell stack 1 may be formed by stacking the battery cells 10 in a vertical direction as shown in FIG. 2. In addition, in the present embodiment, at least one of the stacked battery cells 10 is stacked in a different direction.

More specifically, as shown in FIG. 4, in the present embodiment, the battery cell 10 may include a first battery cell 10a and a second battery cell 10b along a direction in which the second sealing portion 2022 is disposed. In the present embodiment, the first battery cell 10a in the present embodiment may be defined as a battery cell 10 in which the second sealing portion 2022 is disposed to face a second heat dissipation member 50 to be described later, and a heat dissipating surface in which a sealing portion 202 is not disposed is exposed externally of an insulation space S described later and disposed to contact a first heat dissipation member 40.

In addition, in the second battery cell 10b, the second battery cell 10b in the present embodiment may be defined as a battery cell 10 in which the second sealing portion 2022 is disposed to face the first heat dissipation member 40, and a heat dissipating surface is exposed externally of an insulation space S and disposed to contact a second heat dissipation member 50.

Here, a meaning of contact is a concept including not only a direct contact, but also a contact through an adhesive or a heat conductive member 90 to be described later as a medium.

In the present embodiment, the first battery cell 10a and the second battery cell 10b are battery cells 10 having the same configuration, and are distinguished only by a dispositional direction of the second sealing portion 202 and the heat dissipating surface.

As shown in FIG. 4, in the cell stack 1 in the present embodiment, a first battery cell 10a and a second battery cell 10b are alternately and repeatedly stacked. Therefore, in the battery cell 10 of the present embodiment, even if the first battery cell 10a and the second battery cell 10b are alternately disposed, the battery cell 10 may be configured such that the electrode leads 15 of the first battery cell 10a and the second battery cell 10b are aligned in a line.

Through such a configuration, the battery module 100 according to the present embodiment can increase a heat dissipation effect of the battery cell 10.

In the battery cell 10 of the present embodiment, since a sealing portion 202 is disposed only on three surfaces of the external surfaces of the accommodating portion 204, a heat dissipating surface without the sealing portion 202 has a greater contact area than other surfaces, such that a heat dissipation path may be minimized. Therefore, the heat dissipating surface has a greater heat dissipation effect than the other surfaces.

When the cell stack 1 is comprised of only the first battery cells 10a, all of the heat transferred from the battery cells may be concentrated on the intermediate plate member 42, which will be described later. Similarly, when the cell stack 1 is configured with only the second battery cells 10b, all of the heat transferred from the battery cells may be concentrated on the second heat dissipation member 50. Therefore, since heat is concentrated on a specific portion, it is difficult that the heat is effectively dissipated.

Accordingly, in the present embodiment, the battery cell stack 1 is configured by alternately stacking at least one first battery cell 10a and at least one second battery cell 10b as described above. In this case, since heat can be evenly dissipated to the intermediate plate member 42 and the second heat dissipation member 50, a heat transfer efficiency may be increased. In addition, since a distance between the second sealing portions 2022 expands, it is possible to prevent insulation between the battery cells 10 from being destroyed by a contact between the second sealing portions 2022.

The cell stack 1 according to the present embodiment may include a blocking member 80.

The blocking member 80 may be comprised of a single member having a curved shape, and as shown in FIG. 2, the blocking member 80 may be disposed in zigzag form to provide a plurality of insulation spaces S in which the respective battery cells 10 are disposed. More specifically, the blocking member 80 is made by folding the continuous sheet of material multiple times while alternating the direction of folding in a zigzag pattern in order to form the multiple insulation spaces S. In this case, each of the insulation spaces S are defined by a rectangular box frame having a top side, a bottom side and only one of the lateral sides enclosed. Moreover, each of insulation spaces are have an open longitudinal lateral side that is opposite to an open longitudinal lateral side of an adjacent insulation space. Accordingly, the blocking member 80 may be formed of a member having flexibility and in a form of a sheet or a film that is easy to change the shape.

The blocking member 80 is provided to block the propagation of flame or heat by the flame to other battery cells 10 when a flame occurs in any one battery cell 10. Therefore, in the present embodiment, each of the insulation spaces S can be maximally isolated from each other.

In the battery module 100 of the present embodiment, one battery cell 10 is insertedly disposed in one insulation space S. Accordingly, each of the battery cells 10 may be disposed so that both wide surfaces of the accommodating portion 204 face a blocking member 80, and the blocking member 80 may be disposed to surround at least two surfaces of the respective battery cells 10. For example, the blocking member 80 is disposed to surround at least a top surface, a bottom surface and one of the longitudinal side surfaces of each of the battery cells 10.

Since the blocking member 80 of the present embodiment should block the propagation of heat as much as possible, the blocking member 80 may be formed of a material having thermal conductivity of 0.1 W/mK or less. In addition, since the blocking member 80 should also block a spread of the flame as much as possible, the blocking member 80 may be formed of a flame-resistant material that is ignited at a temperature of 800° C. or higher.

For example, the blocking member 80 may be formed of a material that includes ceramic to perform fire resistance/insulation, a pad-type material made by applying a gel-type insulating material including sodium silicate, on a thin film or using the same, and a fiber fire-resisting insulating material such as ceramic wool or glass fiber having flame-retardant performance.

In addition, when the blocking member 80 is made of a rubber material including a ceramic having a thermal blocking performance or formed of a rubber material containing expandable graphite, to be exposed to heat, the blocking member 80 may be configured such that graphite may rapidly expand to form an insulating layer.

In addition, the blocking member 80 may be a member that is elastically compressed when pressure is applied in a thickness direction. In this case, since the blocking member 80 may function as a buffer pad, the number of parts may be minimized by omitting the buffer pad.

In addition, since the blocking member 80 may be formed of an insulating material, it may also provide a function of securing insulation between the battery cells 10.

Through such a configuration, the battery module 100 according to the present embodiment is dispersedly disposed in insulation spaces S in which each of the battery cells 10 are isolated from each other. Therefore, even if a flame is generated in one of the battery cells 10, it is possible to prevent the flame from propagating to the battery cells 10 disposed in the other insulation space S. In addition, it is possible to suppress a rapid transfer of heat to other battery cells 10.

The first heat dissipation member 40 may include a lower plate member 44 on which the cell stack 1 is mounted, an upper plate member 46 disposed to face the lower plate member 44, and an intermediate plate member 42 disposed between the lower plate member 44 and the upper plate member 46 to connect the upper plate member 46 and the lower plate member 44 to each other.

The cell stack 1 may be insertedly disposed in an accommodating space D formed by the lower plate member 44, the upper plate member 46, the intermediate plate member 42, and the second heat dissipation member 50 to be described later.

The intermediate plate member 42 may be disposed on one side of the cell stack 1 and may be disposed in a manner substantially perpendicular to the battery cells 10. The lower plate member 44 may be fastened to a lower end of the intermediate plate member 42 and may be disposed to face a lower surface of the cell stack 1. The upper plate member 46 may be fastened to an upper end of the intermediate plate member 42 and may be disposed to face an upper surface of the cell stack 1.

The cell stack 1 may be coupled to the first heat dissipation member 40 such that a wide surface of the accommodating portion 204 of the battery cell 10 faces the lower plate member 44 and the upper plate member 46. Accordingly, the battery cells 10 may be disposed such that a planar direction thereof is parallel to a planar direction of the lower plate member 44 and the upper plate member 46.

The upper plate member 46 is spaced apart from the lower plate member 44 by a predetermined distance, and is disposed parallel to the upper plate member 46. The upper plate member 46 and the lower plate member 44 may be formed to have the same size or the same area, but the configuration of the present disclosure is not limited thereto.

The intermediate plate member 42 may be disposed to cross a space between the lower plate member 44 and the upper plate member 46 to divide the space between the lower plate member 44 and the upper plate member 46. A cell stack 1 may be disposed in each accommodating space D divided by the intermediate plate member 42. Accordingly, the intermediate plate member 42 may be disposed between the two cell stacks 1.

The intermediate plate member 42 may be disposed such that a planar direction thereof is perpendicular to a planar direction of the lower plate member 44 and the upper plate member 46. However, the present disclosure is not limited thereto.

For example, the intermediate plate member 42 may be coupled to a central portion of the lower plate member 44 and the upper plate member 46 so that a side surface of the first heat dissipation member 40 forms an "I" shape. However, the present disclosure is not limited thereto, and the intermediate plate member 42 may also be disposed to be connected to corners of the lower plate member 44 and the upper plate member 46 so that the side surface of the first heat dissipation member 40 has a "c" shape.

The first heat dissipation member 40 may be made of a material having high thermal conductivity. For example, the first heat dissipation member 40 may be formed of a material such as metal, and more specifically, may be formed of a material such as aluminum or steel. However, the present disclosure is not limited thereto, and as long as it is a material having high thermal conductivity, various materials may be used within the scope of the present disclosure.

The second heat dissipation member 50 and the side cover 60 are coupled to the first heat dissipation member 40 to provide an accommodating space D in which the cell stacks 1 are disposed. Accordingly, the second heat dissipation member 50 may function as a case for protecting the battery cells 10 accommodated in the first heat dissipation member 40.

To this end, the second heat dissipation member 50 and the side cover 60 are coupled to the first heat dissipation member 40 in a form to block the accommodating space D in which the battery cell 10 is accommodated from the outside, to separate the accommodating space D from the outside.

The second heat dissipation member 50 may be formed in a flat plate shape, may be disposed on the other side of the cell stack 1, and may be coupled to long side corners of the upper plate member 46 and the lower plate member 44. Accordingly, the second heat dissipation member 50 may be disposed to have a form to have one side coupled to the upper plate member 46 and the other side coupled to the lower plate member 44 to face the intermediate plate member 42.

The second heat dissipation member 50 may be made of a material having high thermal conductivity, such as metal. For example, the second heat dissipation member 50 may be formed of a material such as aluminum or steel, like the first heat dissipation member 40, or may also be formed of the same material as the first heat dissipation member 40. However, the configuration of the present disclosure is not limited thereto, and even if it is not metal, various materials may be used as long as the material has thermal conductivity similar to that of the metal.

The side cover 60 may be coupled to short side corners of the upper plate member 46 and the lower plate member 44, that is, both end portions of the first heat dissipation member 40.

An electrode lead 15 of the battery cells 10 may be disposed at both end portions of the first heat dissipation member 40. Accordingly, the side cover 60 may be disposed to face the electrode leads 15 of the battery cells 10.

Connection terminals 69 for electrically connecting the battery cells 10 externally may be disposed on the side cover 60. In the present embodiment, the connection terminal 69 may be comprised of a conductive member and may be electrically connected to the electrode leads 15 of the battery cell 10 via a bus bar (not shown).

A bus bar assembly 70 may be disposed between the side cover 60 and the electrode leads 15. The busbar assembly 70 may include a busbar electrically connected to the electrode leads 15, whereby the electrode leads 15 may be electrically connected to an external element of the battery module via a busbar and a connection terminal 69.

The side cover 60 may be formed of a metal material, but is not limited thereto, and may be formed of an insulating material such as a resin.

The side cover 60 may be coupled to the first heat dissipation member 40 and the second heat dissipation member 50 through a fixing member such as a rivet, a screw, a bolt, or a snap fit. However, the present disclosure is not limited thereto, and the side cover 60 may also be coupled in a sliding manner, or coupled by using laser welding, spot welding, adhesive, or the like.

A heat transfer member 90 may be disposed between the second heat dissipation member 50 and the cell stack 1.

The heat transfer member 90 may be provided to effectively transfer heat generated in the battery cell 10.

The heat transfer member 90 may be disposed to be in direct contact with a heat dissipating surface of the battery cell 10 to rapidly transfer heat generated in the battery cell 10 to the second heat dissipation member 50.

To this end, the heat transfer member 90 may be made of a material having high thermal conductivity. For example, the heat transfer member 90 may be formed of any one of a thermal grease, a thermal adhesive such as an epoxy resin, and a thermal conductive pad, but is not limited thereto.

The heat transfer member 90 may be disposed on an inner surface of the second heat dissipating member 50 in a form of a pad, or may be formed by applying a gel or paste to the inner surface of the second heat dissipation member 50.

The heat transfer member 90 of the present embodiment has high insulating properties, and for example, a material having a dielectric strength in a range of 10 to 30 KV/mm may be used. Accordingly, in the battery module 100 according to the present embodiment, even if insulation is partially broken in a battery cell 10, insulation between the battery cell 10 and the second heat dissipation member 50 may be maintained by the heat transfer member 90 disposed around the battery cell 10.

In addition, since the heat transfer member 90 is disposed to fill a space between the battery cells 10 and the second heat dissipation member 50, an error in an installation space may be minimized, and a collision between the battery cell and the second heat dissipation member 50 may be prevented. Furthermore, overall rigidity of the battery module 100 may be reinforced.

Meanwhile, in the present embodiment, a case in which the heat transfer member 90 is disposed only between the cell stack 1 and the second heat dissipation member 50 is taken an example. However, the configuration of the present disclosure is not limited thereto, and a heat transfer member may be additionally disposed in various positions as necessary. For example, the heat transfer member 90 may also be disposed between the cell stack 1 and the intermediate plate member 42.

Figure 5:
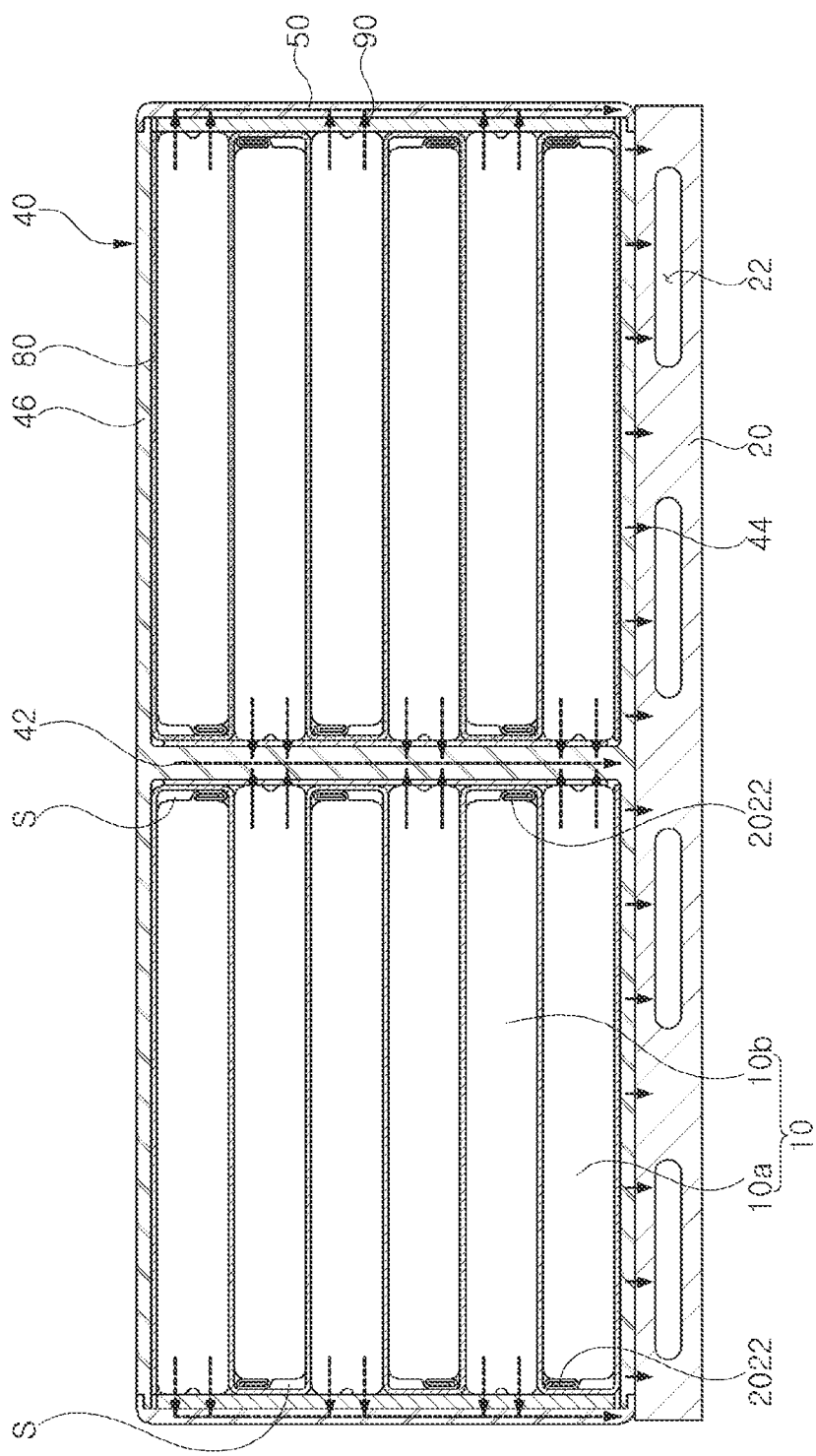
FIG. 5 is a cross-sectional view of a battery module according to another embodiment of the present disclosure.

FIG. 5 is a cross-sectional view of a battery module according to another embodiment of the present disclosure.

Referring to FIG. 5, the battery module of the present embodiment may include a cooling device 20.

In the present embodiment, the cooling device 20 is a water-cooled cooling device having a cooling passage 22 therein. However, the configuration of the present disclosure is not limited thereto, and an air-cooled cooling device may also be applied.

The cooling device 20 may be integrally coupled to a first heat dissipation member 40 to be included in a battery module. In the present embodiment, the cooling device 20 is coupled to an outer surface of a lower plate member 44 of the first heat dissipation member 40. However, the present disclosure is not limited thereto, and if necessary, the cooling device 20 may be disposed on an outer surface of an upper plate member 46 or an outer surface of a second heat dissipation member 50.

In addition, separately from a battery module, a cooling device may also be disposed in a device or a structure on which the battery module is mounted, and a battery module may be seated on the cooling device.

The battery module according to the present embodiment configured as described above, battery cells 10 are disposed in each insulation space S partitioned by a blocking member 80. Therefore, even if a flame is generated in any one battery cell 10, it is possible to minimize a spread of the flame to the other battery cell or a transfer of heat.

In addition, an arrow in FIG. 5 indicates a flow of heat. Referring FIG. 5, in the battery module of the present embodiment, the heat generated in the battery cell 10 is dispersed to an intermediate plate member 42 and a second heat dissipation member 50 and dissipated. Therefore, it is possible to increase heat transfer efficiency.

Meanwhile, the present inventive concept is not limited to the above-described embodiment and various modifications are possible.

FIGS. 6 to 9 are cross-sectional views schematically illustrating a cell stack of a battery module according to another example embodiment of the present inventive concept, respectively.

Figure 6:
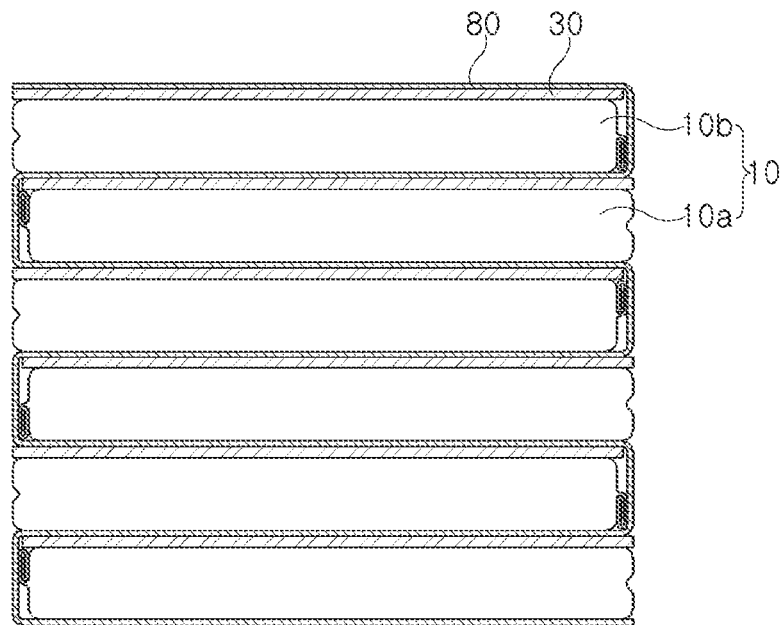
FIGS. 6 to 9 are cross-sectional views schematically illustrating a cell stack of a battery module according to another embodiment of the present disclosure, respectively.
Figure 7:
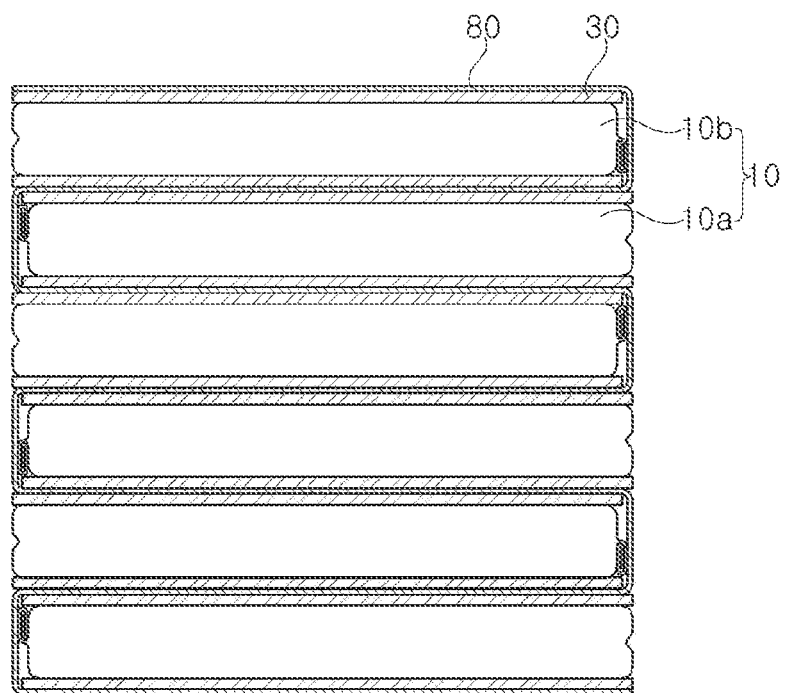

Referring to FIGS. 6 and 7, a cell stack according to the present example embodiment may include at least one flame-retardant member 30.

One or a plurality of flame-retardant members 30 may be disposed between battery cells 10.

The flame-retardant member 30 may be formed of a member having flame-retardant or flame-resistant performance. Here, flame-resistant performance means performance to prevent a spread of combustion, and the flame-retardant performance means performance in which a material does not burn well, even if a fire is ignited. Therefore, the flame-retardant member 30 may have combustibility to a degree that does not become a factor in combustion expansion itself, or may have a property of not being burned.

The flame-retardant member 30 may be formed in a form of a sheet having rigidity, and at least one thereof may be disposed between the battery cells 10 to more effectively suppress a spread of heat or a flame.

Since the flame-retardant member 30 has to block propagation of the flame, the flame-retardant member 30 may be formed of a flame-resistant material, a non-combustible material, or a fire-resistant insulating material. In the present embodiment, as the flame-retardant member 30, a sheet including mica may be used. However, it is not limited to thereto, and any one of various materials such as stainless steel, graphite, graphene, carbon fiber reinforced plastics (CFRP), glass fiber reinforced plastics (GFRP), non-woven compressible fiber, aerogel, and the like, may be used.

Furthermore, the flame-retardant member 30 may be provided by providing flame-retardant performance or flame-resistant performance by using a chemical to a combustible material such as fiber.

In addition, since the flame-retardant member 30 is in direct contact with the battery cell 10, the flame-retardant member 30 may be formed of an electrical insulating material. Therefore, when the flame-retardant member 30 is made of stainless steel, an insulating material may be coated on a surface of the flame-retardant member 30 in contact with the battery cell 10.

In addition, it is also possible to configure the flame-retardant member 30 of the same material as a blocking member 80.

As the flame-retardant member 30 is disposed between the battery cells, the blocking member 80 may be disposed to surround the battery cell 10 and the at least one flame-retardant member 30 together.

Referring to FIG. 6, the blocking member 80 is configured to alternately surround at least one battery cell and one flame-retardant member 30. Accordingly, one battery cell and one flame-retardant member are disposed in one insulation space.

In addition, referring to FIG. 7, the blocking member 80 is configured to alternately surround one battery cell 10 and two flame-retardant members 30 disposed on both sides of the battery cell 10. Accordingly, one battery cell and two flame-retardant members are disposed in one insulation space.

As such, the flame-retardant member 30 may be disposed in various forms as needed.

Meanwhile, the battery module according to the present disclosure may include a buffer pad or a cooling pad instead of the flame retardant member 30 described above.

The buffer pad may be compressed and elastically deformed when the battery cell 10 expands. Accordingly, it is possible to suppress swelling of an entire volume of the cell stack 1. To this end, the buffer pad may be formed of an insulating material such as polyurethane, and may be configured in a form of a foam pad. However, the present disclosure is not limited thereto.

The cooling pad may be configured in a form of a cooling plate, and may be provided to quickly transfer heat generated from the battery cells 10 to a cooling device 20 side. Accordingly, the cooling plate may be configured to contact a first heat dissipation member 40 or a second heat dissipation member 50 or a cooling device (20 in FIG. 6).

A cooling pad may be made of a metal material having high thermal conductivity, but is not limited thereto. In addition, the cooling pad may include a cooling passage through which coolant circulates therein. In this case, the cooling passage may be connected to the cooling device 20.

Figure 8:
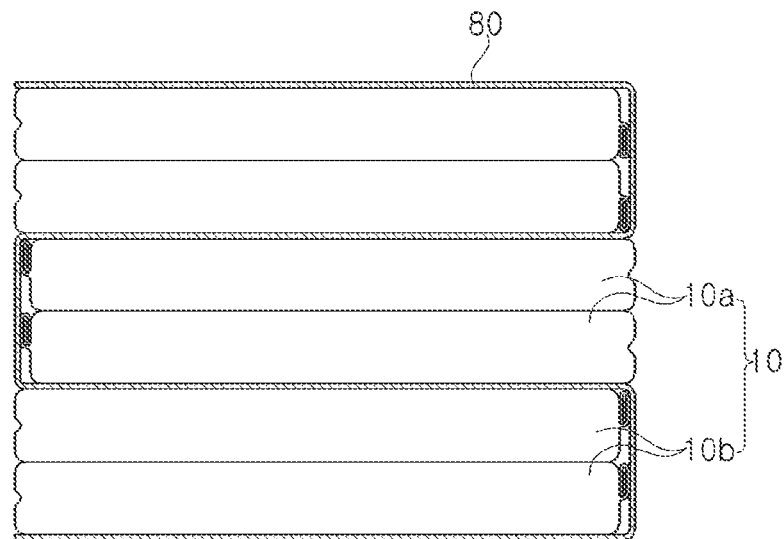

Referring to FIG. 8, in the cell stack according to the present embodiment, a plurality of first battery cells 10*a* and a plurality of second battery cells 10*b* are alternately stacked.

Accordingly, the plurality of first battery cells 10*a* or the plurality of second battery cells 10*b* are disposed in one heat insulation space.

In the present embodiment, a case in which two first battery cell 10*a* and two second battery cell 10*b* are alternately stacked is taken as an example. However, the configuration of the present disclosure is not limited thereto, and it is also possible to configure three or more to be alternately disposed as needed. However, the configuration of the present disclosure is not limited thereto, and it may also be configured such that three or more are alternately disposed as needed.

In addition, in the present embodiment, an example in which the first battery cells 10*a* and the second battery cells 10*b* are alternately disposed in the same number is taken as an example, but the present embodiment is not limited thereto. The number of first battery cells 10*a* and the number of second battery cells 10*b* may also be configured differently as needed, as the two first battery cells 10*a* and the one second battery cell 10*b* are alternately disposed.

In this case, since an amount of the blocking member 80 disposed between the battery cells 10 can be reduced, an overall volume of the cell stack 1 can be minimized, and thus energy density of the battery module can be increased.

Meanwhile, although not illustrated, as in the above-described embodiment, the cell stack of the present embodiment may also be configured to include a flame-retardant member 30 or a buffer member, and a cooling pad, described above between the battery cells 10.

Figure 9:
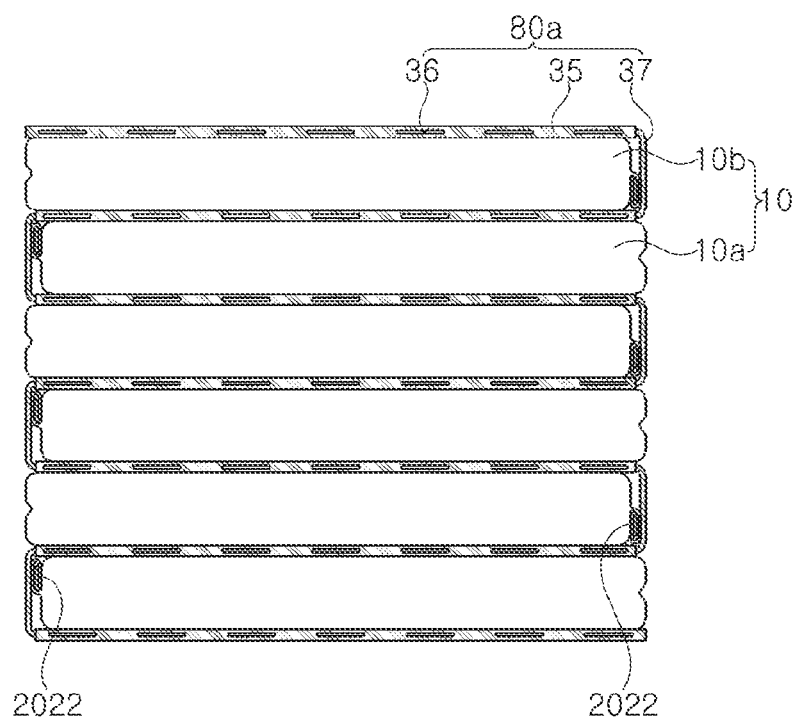

Referring to FIG. 9, a blocking member 80*a* according to the present embodiment may include a cooling member 35 disposed between the battery cells 10, and a connection member 37 disposed to surround a second sealing portion 2022 to the cooling members 35.

The cooling member 35 may include a cooling passage 36 through which the coolant circulates therein. In this case, when the cooling member 35 is melted by the flame, the coolant is directly supplied to the flame, so that a spread of the flame can be suppressed.

A blocking member 80 of the above-described embodiment may be used as the connection member 37. However, the present disclosure is not limited thereto.

As set forth above, according to an embodiment of the present disclosure, heat generated in a battery module is dispersed and discharged through various paths, so that heat dissipation efficiency may be increased.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

While example embodiments have been shown and described above, it will be apparent to those skilled in the art that modifications and variations could be made without departing from the scope of the present inventive concept as defined by the appended claims.

For example, in the above-described embodiments, the case of including the cell accommodating member is taken as an example, but the above-described embodiments may be variously applied as long as the embodiments show a structure include at least one cell stack described in the above-described embodiments, and that is capable of dissipating heat from a heat dissipating surface of the battery cell on both sides of the cell stack.

For example, various modifications are possible, such as omitting the intermediate plate member and configuring the second heat dissipation member to be disposed on both surfaces of one cell stack, respectively. In addition, each of the embodiments may be implemented in combination with each other.

What is claimed is:

1. A battery module, comprising:
   a battery cell stack in which a plurality of battery cells are stacked;
   a first heat dissipation member disposed on a first side of the cell stack;
   a second heat dissipation member disposed on a second side of the cell stack; and
   a blocking member having a lower thermal conductivity than either of the first heat dissipation member or the second heat dissipation member, providing a plurality of insulation spaces in which the battery cells are disposed, the blocking member surrounding at least one surface of each of the battery cells and configured to direct heat flow toward the first side and the second side of the cell stack;
   wherein the plurality of the battery cells, include
   a first battery cell having a surface contacting the first heat dissipation member; and
   a second battery cell having a surface contacting the second heat dissipation member.

2. The battery module of claim 1, wherein each of the battery cells comprises:
   an accommodating portion in which an electrode assembly is disposed, and
   a sealing portion sealing at least part of a circumference of the accommodating portion,
   wherein any external surface of the accommodating portion of each battery cell on which the sealing portion is not disposed is formed as a heat dissipating surface, and
   wherein the surface of the first battery cell and the surface of the second battery cell contacting the first and second dissipation member, respectively, are formed as the heat dissipating surfaces.

3. The battery module of claim 1, wherein the blocking member is disposed in a zigzag form to surround the at least one surface of each of the battery cells.

4. The battery module of claim 1, wherein the blocking member is disposed to surround at least two surfaces of each of the battery cells.

5. The battery module of claim 1, wherein the blocking member is formed of a single member having flexibility.

6. The battery module of claim 5, wherein the blocking member is formed of a flame-resistant material that ignites at a temperature of 800° C. or higher.

7. The battery module of claim 6, wherein the blocking member is formed of a material having thermal conductivity of 0.1 W/mK or less.

8. The battery module of claim 1, wherein, in the cell stack, the first battery cell and the second battery cell are each disposed in one of the plurality of the insulation spaces.

9. The battery module of claim 1, wherein, in the cell stack, the first battery cell and the second battery cell are each disposed to be alternately stacked.

10. The battery module of claim 1, wherein the cell stack comprises at least one plate-shaped flame-retardant member or a cooling member disposed between the battery cells.

11. The battery module of claim 10, wherein the flame-retardant member is formed in a form of a sheet or a foam pad, is formed of a flame-resistant material, and has rigidity.

12. The battery module of claim 1, wherein the blocking member comprises plate-shape cooling members disposed between the battery cells, and a connection member connecting the cooling members to each other.

13. The battery module of claim 12, wherein the cooling member has a cooling passage through which a coolant circulates therein.

* * * * *